United States Patent
Green et al.

(10) Patent No.: US 9,635,195 B1
(45) Date of Patent: Apr. 25, 2017

(54) CUSTOMIZABLE GRAPHICAL ELEMENTS FOR USE IN ASSOCIATION WITH A USER INTERFACE

(75) Inventors: David P. Green, Castaic, CA (US); Tommi J. Iten, Redondo Beach, CA (US); Eric J. Bennett, Los Angeles, CA (US); Tyson L. Wintibaugh, Marina del Rey, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1655 days.

(21) Appl. No.: 12/343,825

(22) Filed: Dec. 24, 2008

(51) Int. Cl.
*G06F 3/00* (2006.01)
*G06F 9/00* (2006.01)
*G06F 17/00* (2006.01)
*H04N 1/00* (2006.01)

(52) U.S. Cl.
CPC .............. *H04N 1/00183* (2013.01)

(58) Field of Classification Search
CPC .............. H04N 5/225; H04N 1/00183; H04N 1/00185; H04N 1/00389; H04N 1/00411; G06F 9/4443; G06F 8/34; G06F 3/0486; G06F 8/38; G06F 3/0481; G06F 3/0482; G06F 3/04812; G06F 3/04847; G06Q 10/10
USPC ....... 715/762, 763, 864, 765, 716, 719, 727, 715/733, 734, 746, 751, 753, 866, 848, 715/861, 863
See application file for complete search history.

(56) References Cited

U.S. PATENT DOCUMENTS

| | | | |
|---|---|---|---|
| 6,227,974 B1* | 5/2001 | Eilat et al. | 463/40 |
| 7,386,799 B1* | 6/2008 | Clanton et al. | 715/758 |
| 2003/0005439 A1* | 1/2003 | Rovira | 725/37 |
| 2003/0066074 A1* | 4/2003 | Zimmerman et al. | 725/14 |
| 2005/0054381 A1* | 3/2005 | Lee et al. | 455/557 |
| 2006/0025282 A1* | 2/2006 | Redmann | 482/8 |
| 2006/0294465 A1* | 12/2006 | Ronen et al. | 715/706 |
| 2007/0113181 A1* | 5/2007 | Blattner et al. | 715/706 |
| 2007/0167204 A1* | 7/2007 | Lyle et al. | 463/9 |
| 2007/0207846 A1* | 9/2007 | Burak et al. | 463/9 |
| 2007/0233839 A1* | 10/2007 | Gaos | 709/223 |
| 2007/0247979 A1* | 10/2007 | Brillon et al. | 369/30.06 |
| 2008/0141326 A1* | 6/2008 | Thompson et al. | 725/118 |
| 2008/0215972 A1* | 9/2008 | Zalewski et al. | 715/706 |
| 2008/0215973 A1* | 9/2008 | Zalewski et al. | 715/706 |
| 2008/0301556 A1* | 12/2008 | Williams et al. | 715/706 |

\* cited by examiner

*Primary Examiner* — Kieu Vu
*Assistant Examiner* — Anita D Chaudhuri
(74) *Attorney, Agent, or Firm* — Hanley, Flight & Zimmerman, LLC (57) ABSTRACT

Customizable graphical elements for use in association with a user interface are described. An example apparatus for use in a broadcast media presentation system includes a user interface to enable a user interaction with the broadcast media presentation system, and a controller to implement one or more customizable graphical elements to be displayed in association with the user interface, wherein the one or more customizable graphical elements are to be animated to interact with the user interface.

17 Claims, 9 Drawing Sheets

CUSTOMIZABLE GRAPHICAL ELEMENTS FOR USE IN ASSOCIATION WITH A USER INTERFACE

FIELD OF THE DISCLOSURE

The present disclosure relates generally to media presentation systems and, more particularly, to customizable graphical elements for use in association with a user interface.

BACKGROUND

Media presentation systems often provide a user interface through which commands can be received and information conveyed. A typical user interface is implemented in a series of on-screen menus, lists, and/or guides that communicate programming broadcast schedules, provide ordering information, enables a user to configure the media presentation system, etc. Often, the user manipulates a cursor (e.g., via a remote control) through the various user interface elements to access different segments, options, or features.

SUMMARY OF THE INVENTION

Described herein are customizable graphical elements for use in association with a user interface. The example methods and apparatus described herein enable one or more users to select and/or configure the customizable graphical elements to be displayed in a media presentation system such as, for example, a television receiving signals from a broadcast transmission system. In some examples, a first user selects and configures a first customizable graphical element according to a first set of preferences and a second user selects and configures a second customizable graphical element according to a second set of preferences. In such instances, different members of a household can choose to interact with the customizable graphical element configured according to their preferences.

In some example implementations, the customizable graphical elements are configurable via a website accessible by the users of the media presentation system on which the customizable graphical elements are implemented. In such instances, personal files can be uploaded to a server implementing the website to further personalize the customizable graphical elements.

Other example implementations are possible.

DETAILED DESCRIPTION

The example methods and apparatus described herein enable one or more users to customize or personalize one or more elements of a user interface using the example customizable graphical elements described herein. One or more customizable graphical elements can be chosen by one or more users from a source of data provided by, for example, administrators of a media presentation system. Selected and/or default customizable graphical elements can be activated to be displayed by one user during a viewing session.

The customizable graphical elements are displayed in association with the user interface in response to, for example, an activation of a menu or program guide. In one example, a customizable graphical element appears on a screen upon engagement of a 'Menu' button and is animated to present a menu to the user in a manner consistent with the aspects or settings of an active customizable graphical element. In other examples, the graphical elements are displayed to convey a message to the user regarding, for example, a status of the media presentation system or any aspect thereof.

As described in greater detail below, the customizable graphical elements are designed to have a set of characteristics that may appeal to one or more users of the media presentation system. In one example described herein, the customizable graphical elements correspond to live or animated characters from one or more movies or television programs. In other examples, default customizable graphical elements can be modified to reflect the personal aspects, hobbies, and/or interests of the user. Generally, the customizable graphical elements enable the user to further customize an interaction with the media presentation system according to personal preferences or predilections. Such alternative and/or additional customization enhances the users' experience of interacting with the media presentation system. Further, the example customizable graphical elements described herein supplement standard user interfaces with additional features such as, for example, games that can result in rewards related to the media presentations system.

Moreover, the customizable graphical elements described herein are at times referred to herein as 'avatars.' Further, some components related to or configured to operate the customizable graphical elements described herein are referred to using the term 'avatar.' However, the term 'avatar' is not meant to be limiting in any way, but rather is used as an example descriptive term to describe the customizable graphical elements described herein.

The example methods and apparatus for use in connection with a media presentation system (e.g., a home entertainment system including a media signal decoder and a television) described herein may be implemented in connection with any type of media broadcasting system including, for example, satellite broadcast systems, cable broadcast systems, radio frequency wave broadcast systems, etc. By way of illustration, an example broadcast system is described below in connection with FIG. 1 and an example receiver (e.g., set-top-boxes, broadcast signal decoders, etc.) is described in detail below in connection with FIG. 2. Further, while the following disclosure is made with respect to example DIRECTV® services and systems, it should be understood that many other delivery systems are readily applicable to the described methods and apparatus. Such systems include wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi -point Distribution System (LMDS), etc.), and/or fiber optic networks.

Figure 1:
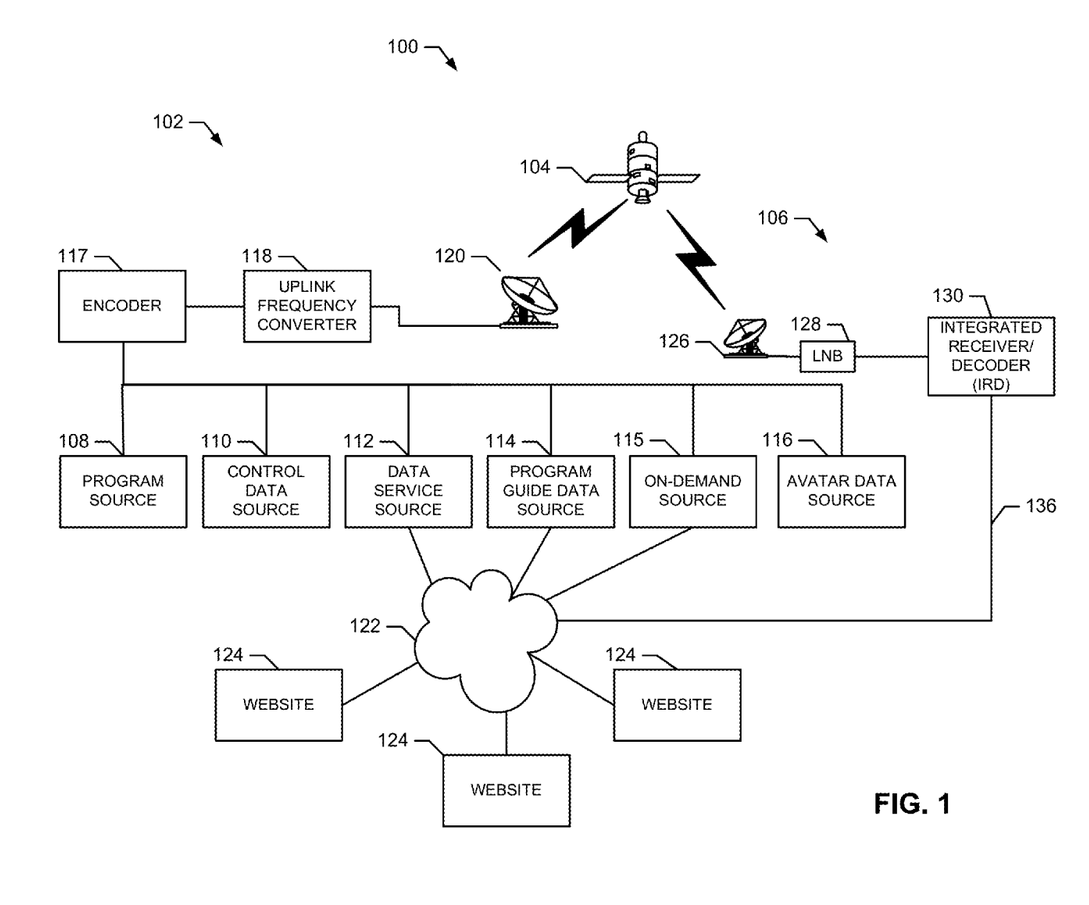
FIG. 1 is a diagram of an example direct-to-home (DTH) transmission and reception system.

As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136. The Internet connection 136 may also facilitate other general data transfers, such as requests and responses to and from one or more servers of a network 122 and the receiver stations 106.

In further detail, the example transmission station 102 of the example system of FIG. 1 includes a plurality of sources of data and/or information (e.g., one or more program sources 108, a control data source 110, a data service source 112, a program guide data source 114, an on-demand source 115, and an avatar data source 116). During operation, information from one or more of these sources 108, 110, 112, 114, 115, 116 passes to an encoder 117, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 117 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The program sources 108 receive video and audio programming from a number of sources, including satellites, terrestrial fiber optics, cable, or tape. The video and audio programming may include, but is not limited to, television programming, movies, sporting events, news, music, on-demand programming, pay-per-view programs, advertisement(s), game(s), on-demand lesson(s), instructional video(s), or any other desirable content.

Like the program sources 108, the control data source 110 passes control data to the encoder 117. Control data may include data representative of a list of SCIDs to be used during the encoding process, or any other suitable information.

The data service source 112 receives data service information and web pages made up of text files, graphics, audio, video, software, etc. Such information may be provided via the network 122. In practice, the network 122 may be the Internet, a local area network (LAN), a wide area network (WAN) or a conventional public switched telephone network (PSTN), or any other suitable network system. The information received from various sources is compiled by the data service source 112 and provided to the encoder 117. For example, the data service source 112 may request and receive information from one or more websites 124. The information from the websites 124 may be related to the program information provided to the encoder 117 by the program sources 108, thereby providing additional data related to programming content that may be displayed to a user at the receiver station 106.

The program guide data source 114 compiles information related to the SCIDs used by the encoder 117 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. The receiver station 106 gathers the SCIDs related to the game, wherein the program guide data source 114 has previously provided to the receiver station 106 a list of SCIDs that correspond to the game. Such a program guide may be manipulated via an input device (e.g., a remote control). For example, a cursor may be moved to highlight a program description within the guide. A user may then select a highlighted program description via the input device to navigate to associated content (e.g., an information screen containing a summary of a television show episode) or to activate an interactive feature (e.g., a program information screen, a recording process, a future showing list, etc.) associated with an entry of the program guide.

The on-demand (OD) source 115 receives data from a plurality of sources, including, for example, television broadcasting networks, cable networks, system administrators (e.g., providers of the DTH system 100), or other content distributors. Such content may include television programs, sporting events, movies, music, and corresponding information (e.g., user interface information for OD content) for each program or event. The content may be stored (e.g., on a server) at the transmission station 102 or locally (e.g., at a receiver station 106), and may be updated to include, for example, new episodes of television programs, recently released movies, and/or current advertisements for such content. Via a user interface, which also may be updated periodically, a user (e.g., a person with a subscription to an OD service) may request (i.e., demand) programming from the OD source 115. The system 100 may then stream the requested content to the user (e.g., over the satellite/relay 104 or the network 122) or make it available for download and storage (discussed further below in connection with FIG. 2). Thus, an OD service allows a user to view, download, and/or record selected programming at any time.

The avatar data source 116 receives data from a plurality of sources including, for example, advertisers, television broadcasting networks, cable networks, system administrators (e.g., providers of the DTH system 100), one or more users of the DTH system 100 (e.g., via an upload process implemented over the network 122), or any other suitable source. Such sources supply the avatar data source 116 with data (e.g., graphics, animation codes or instructions, configuration files, game programs, etc.) that is used to implement the example avatars described herein.

In the illustrated example, administrators of the DTH system 100 provide the avatar data source 116 with a series of graphics, skins, templates, and other objects having different features, characteristics, etc. Additionally or alternatively, a television broadcasting network (e.g., the National Broadcast Company) or an advertiser associated with the television broadcasting network may supply the avatar data source 116 with graphics related to a television program that is or was broadcast by the television broadcasting network. For example, the television broadcasting network may design or configure graphics representing one or more characters of a television program to convey to the avatar data source 116. The television broadcasting network may supply the graphics in a format that can be used by the avatar data source 116 and/or in a format that requires interpretation, reconfiguration, and/or translation to be used by the avatar data source 116. In some implementations, the television broadcasting network provides the avatar data to administrators of the DTH system 100, who then configure the avatar data to a format usable by the avatar data source 116 and the avatar controller (e.g., the avatar controller 240 of FIG. 2) at the receiver stations 106. In some implementations, users of the DTH system 100 upload data (e.g., personal data, such as pictures of a family member or pet) to the avatar data source 116, which the administrators of the DTH system 100 use to configure or design avatars for those users.

The satellite/relay 104 receives the modulated, encoded Ku-band bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to an integrated receiver/decoder (IRD) 130. The IRD 130 may be a set-top box, a personal computer (PC) having a receiver card installed therein, or any other suitable device.

The receiver station 106 may also incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite/relay 104. The signals are coupled from the reception antenna 126 to the LNB 128, which amplifies and, optionally, downconverts the received signals. The LNB output is then provided to the IRD 130.

Figure 2:
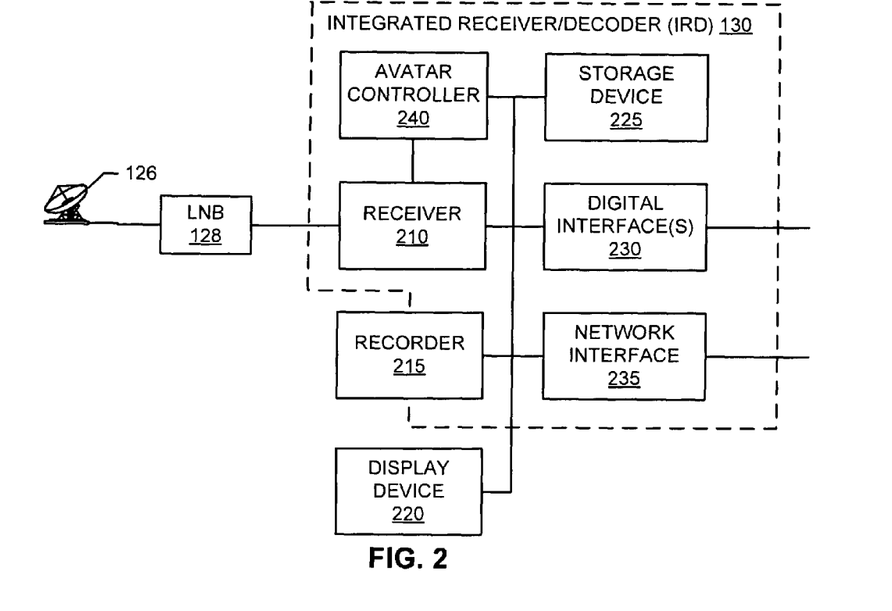
FIG. 2 illustrates an example manner of implementing the example integrated receiver/decoder (IRD) of FIG. 1.

FIG. 2 illustrates one example manner of implementing the IRD 130 (e.g., a set-top box) of FIG. 1. The IRD 130 of FIG. 2 is merely an example and other IRD implementations are possible. The LNB output is provided to a receiver 210, which receives, demodulates, de-packetizes, de-multiplexes, decrypts and/or decodes the received signal to provide audio and video signals to a display device 220 (e.g., a television set or computer monitor) and/or a recorder 215. The receiver 210 is responsive to user inputs to, for example, tune to a particular program.

As illustrated in FIG. 2, the recorder 215 may be implemented separately from and/or within the IRD 130. The recorder 215 may be, for example, a device capable of recording information on a storage device 225, for instance, analog media such as videotape, or computer readable digital media such as a hard disk drive, a digital versatile disc (DVD), a compact disc (CD), flash memory, and/or any other suitable media. The storage device 225 is used to store the packetized assets and/or programs received via the satellite/relay 104 or the network 122 via connection 136 (e.g., a movie requested from the OD source 115). In particular, the packets stored on the storage device 225 are the same encoded and, optionally, encrypted packets created by the transmission station 102 and transmitted via the satellite/relay 104.

To communicate with any of a variety of clients, media players, etc., the example IRD 130 includes one or more digital interfaces 230 (e.g., USB, serial port, Firewire, etc.). To communicatively couple the example IRD 130 to, for instance, the network 122, the Internet, and/or a home network, the example IRD 130 includes a network interface 235 that implements, for example, an Ethernet interface.

Further, the example IRD 130 includes an example avatar controller 240 to communicate with the avatar data source 116 and to implement the avatars described herein in a media presentation system. Specifically, the example avatar controller 240 receives data and instructions from the avatar data source 116 (e.g., in response to user input and/or automatically) and uses the data to present the corresponding avatar(s) to a user. Further, the avatar controller 240 implements an avatar interface to receive input from one or more users regarding activation, preferences, settings, options, and/or selections related to the avatars. The avatar interface may be an independent interface or may be integral to the main user interface of the media presentation system.

Generally, the example avatars described herein are customizable (e.g., by a user and/or a provider of the avatar(s)) elements of a user interface in a media presentation system. Avatars enhance interactive experiences with the media presentation system by adding, for example, variety, familiarity, entertainment, and breadth of control over the media presentation system. Avatars are designed to impart one or more personalities to the user interface that are meant to appeal to an individual user or household. Thus, users are able to select and/or customize any type of avatar (e.g., from those available provided by the avatar data source 116) to add personally desirable traits to the user interface. For example, different features of an avatar may be altered by the user to make the avatar playful, scary, efficient, authoritarian, friendly, neutral, etc. In other examples, an avatar may be assigned hobbies of the user, such as sports, science, photography, etc. Once configured or customized, the avatars can act, for example, as a liaison between a user and a program guide, a main menu, or any other feature of the user interface. In some implementations, the user interface of the media presentation system takes on the properties of an active avatar. For example, when a robotic avatar is active, one or more aspects of the user interface (e.g., the program guide) appear shiny and/or to have a metallic structure or parts (e.g., rivets or welding seams).

In some implementations, avatars may be related to different types of media, such as television programming, movies, or print media (e.g., novels, comics, non-fiction, etc.). For example, an avatar may include graphics representing a character of one's favorite television program or a character from a newly released or classic movie. Such an avatar may be configured to act in a manner analogous to its behavior on the television program or movie.

Additionally, different members of a household may select different avatars to be presented during a viewing session. In other words, a mother may choose to interact with one avatar while she watches television, while a father or son may choose another avatar to be presented while he watches television. Further, the example avatars described herein may complement or supplement the functionality of a user interface. For example, as described in greater detail below, example avatars can implement games, advertisements, periodically triggered entertaining presentations, etc. that are otherwise unavailable in a conventional user interface.

Further, the avatars described herein may include a plurality of graphics or characters to represent a theme or program. For example, an avatar associated with a television character (e.g., Jerry from the television program Seinfeld®) may include a plurality of graphics associated with other aspects (e.g., characters such as Kramer, George, Newman, or Elaine; settings such as an apartment, a coffee house, or a parking garage; and/or props such as a candy dispenser, a hansom cab, or a toupee) of the television show to which the character belonged. In such instances, different graphics may be presented in various situations. For example, a setting from a television show may enclose the program guide or different characters may appear to give the user different messages (e.g., a message regarding the completion of a download or a confirmation of a new order). In other example, where an avatar is configured to have hobbies of similar to those of the user, different graphics may be presented in different situations. For example, if a user configures an avatar to be associated with sports, the avatar may include different graphics (e.g., a basketball hoop, a football field, a baseball stadium) associated with different sports.

Figure 3:
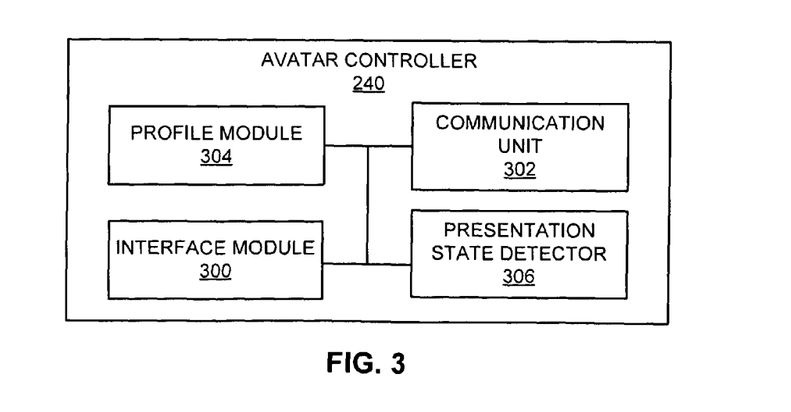
FIG. 3 shows an example implementation of the example avatar controller of FIG. 2.

FIG. 3 illustrates an example implementation of the example avatar controller 240 of FIG. 2. The example search module 240 includes an interface module 300, a communication unit 302, a profile module 304, and a presentation state detector 306. To enable a user to manipulate, configure, select, review, alter, and/or, more generally, manage the avatar(s) described herein, the interface module 300 implements an avatar interface dedicated to the operation and configuration of avatars. In particular, the interface module 300 presents avatar information (e.g., a list of available avatars or configurable aspects of current avatars) obtained from the avatar data source 116 (e.g., via the communication unit 302 as described below) and receives user input (e.g., a selection of an avatar or a configuration instructions) to be used by the other components of the avatar controller 240 or, more generally, the IRD 130.

In the illustrated example, the interface module 300 implements the avatar interface to be an integral part of the main user interface. For example, the main user interface may include a button or key that is linked to the avatar interface, such that the button or key can be selected to access the avatar interface. A remote control may also include a button to access the avatar interface. In other examples, the avatar interface may be designed independent of the properties and/or appearance of the main user interface.

To communicate with the avatar data source 116 (or other sources), the communication unit 302 is coupled to the receiver 210, the digital interface(s) 230, and/or the network interface 235. As described above, such communication devices enable a transfer of information between the IRD 130 and the transmission station 102 and/or the network 122, including any number of servers that are in communication with the network 122. Further, the communication unit 302 is coupled to the storage device 225, where avatar data may be cached or otherwise locally stored to reduce data transmission frequency and/or quantity.

The example communication unit 302 of FIG. 3 facilitates communication between the avatar controller 240 and the avatar data source 116. For example, as described in greater detail below in connection with FIGS. 4A and 4B, the communication unit 302 receives requests for data (e.g., a list of available avatars) from the interface module 300 and relays the requests to the avatar data source 116. In response, the avatar data source 116 sends the list of available avatars and the associated configurable settings (or any other validly requested information) to the avatar controller 240 and the communication unit 302 conveys the list of available avatars and associated configurable settings to the interface module 300. In some implementations, the list of available avatars and other data received from the avatar data source 116 is stored (e.g., cached for a time period, such as one or two weeks) in the IRD 130 (e.g., in the storage device 225 and/or the profile module 304). The interface module 300 then interprets the data and presents the list of available avatars to the user. The example communication unit 302 of FIG. 3 performs similar functions for communication between the profile module 304 and the avatar data source 116. In some example implementations, the interface module 300 and/or the profile module 304 may communicate directly with each other and/or the avatar data source 116.

To store and provide access to the settings that users make via the interface module 300, the profile module 304 tracks and maintains files related to user selections, preferences, options, etc. related to the avatars. In the illustrated example, the profile module 304 additionally stores the avatar files that have been selected (and downloaded) from the avatar data source 116. In particular, the avatars are stored in association with one or more configuration files that include settings for the avatars. Example settings and/or configurations include color schemes, graphic selections, activity frequency (e.g., for avatars that take random and/or scheduled unprompted actions), household member assignments, restrictions (e.g., where an aspect of the avatar is locked until the user meets some threshold, such as a predetermined amount of viewing or interaction with the avatar), game settings, etc. To manage the settings and/or configuration, the interface module 300 receives instructions from the user (e.g., via a portion of the avatar interface dedicated to the configuration of the avatars) and conveys information to the profile module 304 according to the instructions.

In some implementations, the settings and/or configurations of the avatars can be set via a website. For example, the profile module 304 may be communicatively coupled to a server, via the network 122, that is operated and managed by the administrators of the DTH system 100. The server implementing the website may include the data similar to that of the avatar data source 116 and/or additional material (e.g., unique configuration files the enable the user to design and/or create their own customizable avatar). Such a website enables the user to edit or design an avatar with advanced graphic programs and to convey a personal avatar to the IRD 130 and/or, more specifically, the profile module 304 or the storage device 225. For example, the administrators of the DTH system 100 may provide generic avatars (e.g., plain human figures) that can be modified on the website to include characteristics of the user (e.g., features of the user's face, clothing, props, vehicles, or other personalized items).

Additionally or alternatively, the settings and/or configurations of the avatars can be set via a configuration module implemented on a receiver or set-top box (e.g., the example IRD 130 of FIG. 2). The profile module 304 may include the configuration module, which enables the user to edit or design an avatar similar to the website described above. For example, the profile module 304 may initially include one or more default avatars that can be chosen for activation or configured (e.g., personalized) via the configuration module (e.g., using graphic programs installed in the profile module 304).

To detect a state of a media presentation system, the avatar controller 240 includes a presentation state detector 306. The presentation state detector 306 communicates with the receiver 210, the display device 220, and/or another component of the IRD 130 to determine a mode or status of the media presentation system. For example, the presentation state detector 306 may determine that the display device is in a full-screen presentation mode, a program guide mode (in which case the current programming may be displayed in a subsection of the entire screen, such as a picture-in-guide section within the program guide), a recording mode, a download mode, etc. As described in greater detail below, the behavior of the example avatars described herein may depend on a current presentation mode. For example, certain avatar actions may be restricted with the media presentation system is in a full-screen presentation mode to avoid annoying the user.

While an example manner of implementing the avatar controller 240 of FIG. 2 has been illustrated in FIG. 3, one or more of the elements, processes and/or devices illustrated in FIG. 3 may be combined, divided, re-arranged, omitted, eliminated and/or implemented in any other way. Further, the example interface module 300, the example communication unit 302, the example profile module 304, the example presentation state detector 306, and/or, more generally, the example avatar controller 240 of FIG. 3 may be implemented by hardware, software, firmware and/or any combination of hardware, software and/or firmware. Thus, for example, any of the example interface module 300, the example communication unit 302, the example profile module 304, the example presentation state detector 306, and/or, more generally, the example avatar controller 240 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example interface module 300, the example communication unit 302, the example profile module 304, the example presentation state detector 306, and/or, more generally, the example avatar controller 240 of FIG. 3 are hereby expressly defined to include a tangible medium such as a memory, DVD, CD, etc. storing the software and/or firmware. Further still, the example avatar controller 240 of FIG. 3 may include one or more elements, processes and/or devices in addition to, or instead of, those illustrated in FIG. 3, and/or may include more than one of any or all of the illustrated elements, processes and devices.

Although the following discloses example processes through the use of flow diagrams having blocks, it should be noted that these processes may be implemented in any suitable manner. For example, the processes may be implemented using, among other components, software, or firmware executed on hardware. However, this is merely one example and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.), exclusively in software, exclusively in firmware, or some combination of hardware, firmware, and/or software. For example, instructions representing some or all of the blocks shown in the flow diagrams may be stored in one or more memories or other machine readable media, such as hard drives or the like (e.g., the memories 906 and/or 908 of FIG. 9). Such instructions, which may be executed by one or more processors (e.g., the processor 902 of FIG. 9), may be hard coded or may be alterable. Additionally, some portions of the processes may be carried out manually. Furthermore, while each of the processes described herein is shown in a particular order, those having ordinary skill in the art will readily recognize that such an ordering is merely one example and numerous other orders exist. Accordingly, while the following describes example processes, persons of ordinary skill in the art will readily appreciate that the examples are not the only way to implement such processes. Further, while certain buttons (e.g., 'Select' or 'Menu') are described below, it will be appreciated that the titles or names of such buttons are meant for illustrative purposes and that other suitable names, symbols, or numbers may be assigned to similar buttons to represent the following instructions, features, options, and/or instructions similar thereto.

Figure 4A:
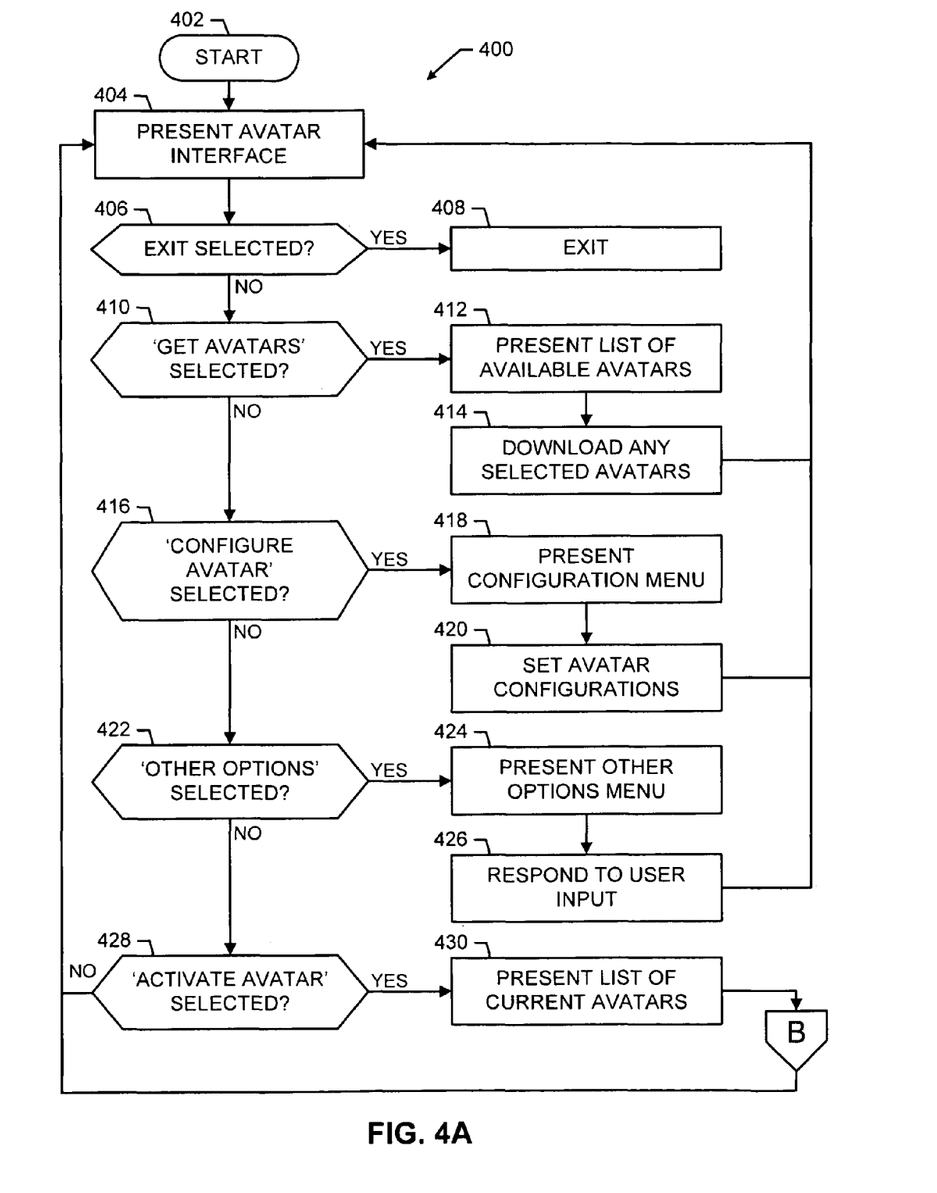
FIGS. 4A and 4B are a flowchart representing an example process that may be performed by a media presentation system implementing the example avatar controller of FIG. 2.
Figure 4B:
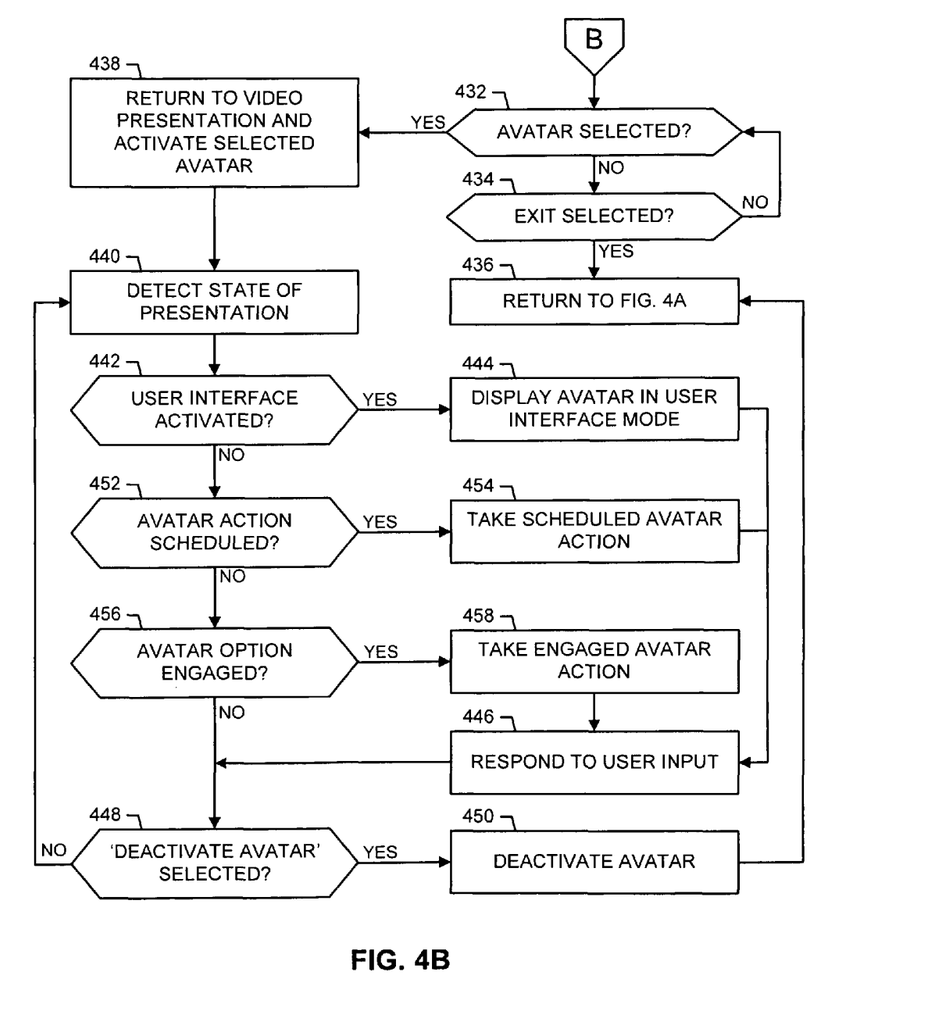
Figure 5:
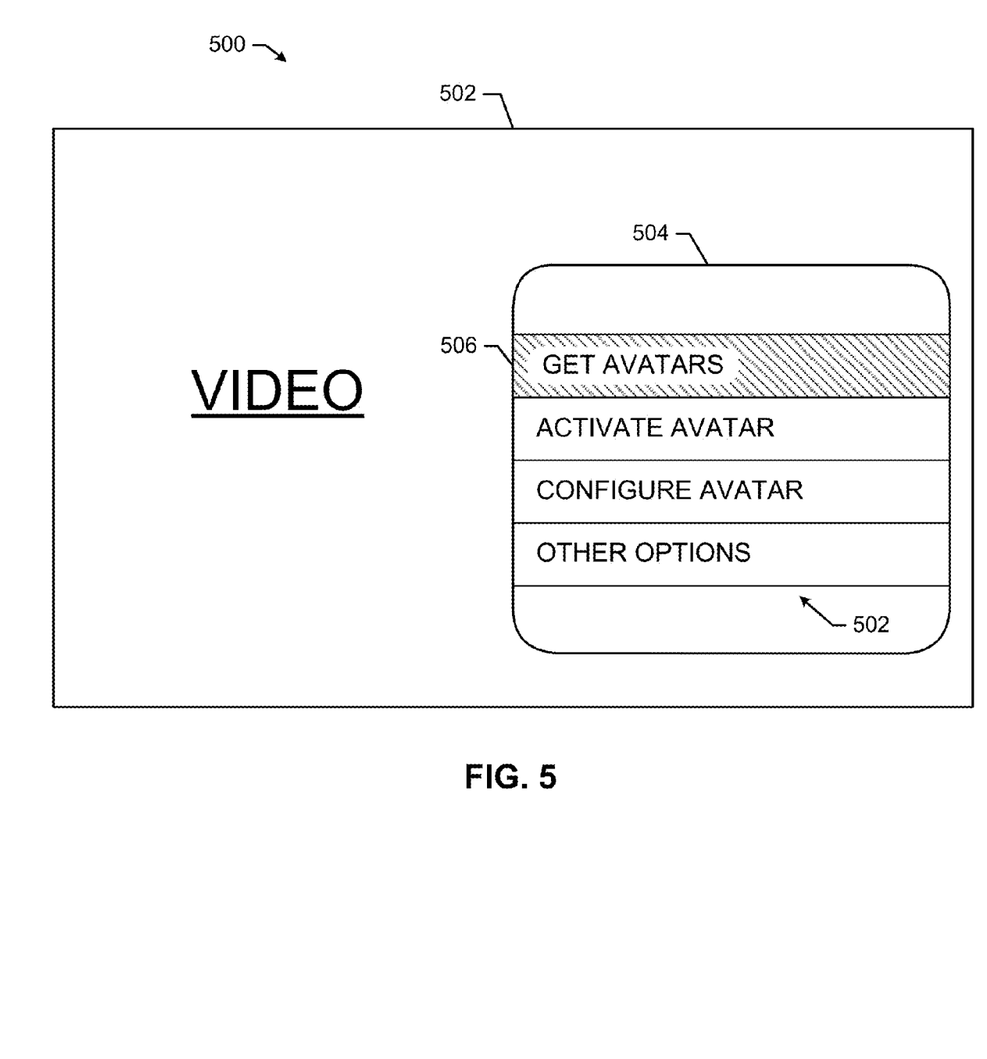
FIG. 5 shows an example screenshot of a media presentation system implementing an example main portion of an example avatar interface.

FIGS. 4A and 4B are a flowchart representing an example process 400 that may be implemented via, for example, the example avatar controller 240 of FIG. 3. Specifically, the example process 400 enables a user to activate, configure, and/or obtain the avatars described herein in a media presentation system. For illustrative purposes, the process 400 is described in conjunction with example screenshots 500, 600, 700, and 800 of FIGS. 5, 6, 7, and 8, respectively. However, the example process 400, the example screenshots 500, 600, 700, and 800, and the associated features and methods described in connection therewith are non-limiting examples meant for illustrative purposes.

The example process 400 of FIG. 4 begins with an engagement of an option to access an avatar interface implemented by the example interface module 300 of FIG. 3 (block 402). For example, a user may engage an on-screen button or menu or a key on a remote control dedicated to an avatar interface, thereby causing the example screenshot 500 of FIG. 5 to be presented on the display device 220 of FIG. 2. The screenshot 500 shows a main menu 502 of an example avatar interface 504 that includes a plurality of example options related to the avatars implemented by the example avatar controller 240 of FIG. 3. In the illustrated example, the plurality of options includes a 'Get Avatars' option, an 'Activate Avatar' option, a 'Configure Avatar' option, and an 'Other Options' option. Using, for example, the remote control to move a cursor or highlight 506 over one of the options, the user engages one of the options by pressing a 'Select' button on the remote control. Such an engagement of one of the options sends input to the interface module 300, which interrupts the input and responds accordingly (e.g., by causing a presentation of a requested menu portion of the avatar interface 504).

In the example process 400 of FIG. 4, if the user selects an 'Exit' button or key on the remote control (block 406), the interface module 300 removes the avatar interface 504 from the display (block 408). If the user selects the 'Get Avatars' option (block 410), the interface module 300 presents a list of available avatars (block 412). As described above, such an operation includes the interface module 300 sending a request to the communication unit 302, which responds by requesting the list of available avatars from the avatar data source 116. The avatar data source 116 provides the communication unit 302 and, thus, the interface module 300, with the list. The contents of the list may be restricted to a preliminary set of avatars (e.g., for new users) or may include a set or subset of additional avatars. For example, the providers of the DTH system 100 may reward loyal users (e.g., long-time customers, customers that upgraded a subscription or package) by enabling such users to access special or advanced avatars (e.g., avatars with enhanced or additional functionality). Additionally or alternatively, rewards may include unlocking features of existing avatars, such as promotional video(s), animation(s), and/or game(s). In some examples, users may also pay a fee to gain access to restricted avatars and/or the access to certain avatars may depend on the type of subscription. In some examples, the avatars may be made available for promotional purposes. For example, an advertiser may provide an avatar for a limited time in association with the release of a new movie.

Further, the list is categorized to ease the task of parsing through the list. The avatars are grouped according to, for example, a type of media (e.g., television, print, cinematic, etc.) from which the avatars originated, game-playing capabilities of the avatars, ratings (e.g., whether the avatars are appropriate for children or adults), restricted status, etc.

The interface module 300 responds to user selections of avatars from the list by sending a request to the avatar data source 116, via the communication unit 302. In response, the avatar data source 116 provides the avatar data associated with the selections to the communication unit 302, which stores the avatar data in, for example, the profile module 304, the storage device 225, and/or any other suitable location (block 414). Alternatively, as described above, some or all of the avatars in the list may have already been stored locally on the IRD 130. For example, the most popular avatars and the most popular configurations thereof may be stored on the IRD 130 of multiple users, thereby reducing demand on the DTH transmission system 100 (e.g., including the avatar data source 116). In such instances, when the user selects an avatar from the list of available avatars, the profile module 306 stores the selected avatar data as an avatar currently available to activate (e.g., in a file or directory dedicated to such avatars). Control then returns to block 404, which causes the interface module 300 to present the avatar interface 504.

If the user selects the 'Configure Avatar' option (block 416), the interface module 300 presents a configuration menu (block 418). The configuration menu includes options that enable the user to set certain aspects of one or more avatars. In the illustrated example, the currently active avatar or, if no avatar is active, the last avatar to be active is configured according to user input on the configuration menu. In other examples, the configuration menu may also include a list of avatars in the avatar controller 240 that may be used to select any of a plurality of avatars for configuration. As described above, the changeable characteristics and/or settings include, for example, color schemes (e.g., textures or other appearance aspects of different elements of the user interface, such as the program guide or on-screen menus), graphic selections, activity frequency (e.g., for avatars that take random and/or scheduled unprompted actions), household member assignments, restrictions (e.g., where an aspect of the avatar is locked until the user meets some threshold, such as a predetermined amount of viewing or interaction with the avatar), game settings, or any other setting associated with the user interface that the user can personalize or customize. In response to receiving user input regarding a configuration change, the interface module 300 conveys the user input to the profile module 304, which responds by storing the configuration input in associated with the appropriate avatar (e.g., the currently active avatar) (block 420). Control then returns to block 404, which causes the interface module 300 to present the avatar interface 504.

If the 'Other Options' option is selected (block 422), the interface module 300 presents a supplementary portion of the avatar interface 504 to the user (block 424). The supplementary portion of the avatar interface 504 includes additional options, such as a 'Play Games' option, a 'Help' option, and/or an 'Info' option. As described above, some or all of the avatars described herein are designed (e.g., by advertisers, the administrators of the DTH system 100, or a television broadcasting network) to interact with the user in a manner to enable game play. For example, an avatar may present the user with one or more trivia questions regarding, for example, the television show from which the avatar originated, the currently tuned programming, popular culture, etc. Good performance on such a game by result in the user gaining access to additional or advanced avatars or functionality thereof. In another example, good performance in a game may result in the user receiving a coupon or voucher for an otherwise fee inducing service or product. For example, a perfect score in a trivia game may enable the user to view or download a pay-per-view program without charge. The interface module 300 responds to the selection of one of the options in the supplemental portion of the avatar interface 504 (block 426) and then control returns to block 404, returning to the main portion of the avatar interface 504.

If the 'Activate Avatar' option is selected (block 428), the interface module 300 presents a list of current avatars (e.g., avatars stored on the IRD 130 and/or, more specifically, the avatar controller 240) (block 430). If an avatar is not selected from the list (block 432 of FIG. 4B), and an 'Exit' button or key on a remote control is selected (block 434), control returns to the main portion of the avatar interface 504 (block 436). On the other hand, if an avatar is selected from the list of avatars on the IRD 130 (block 432), the interface module 300 activates the selected avatar, exits the avatar interface 504, and returns to a full-screen presentation of the current programming (block 438).

When an avatar is active, the avatar controller 240 (e.g., via the interface module 300) presents an active avatar to the user in one or more situations. In the example process of FIGS. 4A and 4B, the avatar activated at block 438 is presented to the user in response to an accessing of a user interface or a portion thereof (e.g., a program guide or menu), according to a predetermined schedule, and/or in response to an engagement of an avatar-related option. Other example implementations may include additional situations or occasions in which an active avatar is presented to the user.

When at least one avatar is active, the presentation state detector 306 determines a current mode of the presentation system and/or the display device 220 (block 440). As described above, the presentation state detector 306 may determine that the presentation system is in a full-screen presentation mode, a program guide mode, a recording mode, a download mode, etc. Such information is conveyed to the interface module 300, which uses the information to allow or restrict certain avatar actions from being performed depending on a current state of the presentation system. While the example process 400 of FIGS. 4A and 4B show the presentation state detector 306 performing at block 440, other example implementations may include such a detection being performed in an ongoing basis and/or according to an independent schedule. For example, the presentation state detector 306 may check for a current mode of presentation periodically, in response to a change, in response to one or more user inputs, or in any other suitable manner.

The interface module 300 then responds to one or more inputs to cause the avatar to interact with the user (e.g., by being displayed, undergoing an animation, and/or taking an action, such as presenting a menu, etc.). In the example process 400 of FIGS. 4A and 4B, if a user interface or an element thereof is activated (block 442), the interface module 300 displays the active avatar in association with or as the user interface (block 444). In some examples, the avatars may be displayed along with the accessed user interface elements without change to the standard appearance to the user interface elements. In other words, the avatars may be supplementary to the standard user interface elements. In other examples, certain characteristics or aspects of the accessed user interface elements may change from their standard appearance according to one or more aspects (e.g., thematic colors) of the active avatar. Additionally, the avatars may perform a presentation action (e.g., an animation) before or during the presentation of an accessed user interface element. For example, a character or figure may be animated to fly across the screen and drop the user interface element into the display, after which the user interface element appears in its standard form. Alternatively, the user interface element that was "dropped in" by the avatar may include varied characteristics corresponding to the active avatar.

Figure 6:
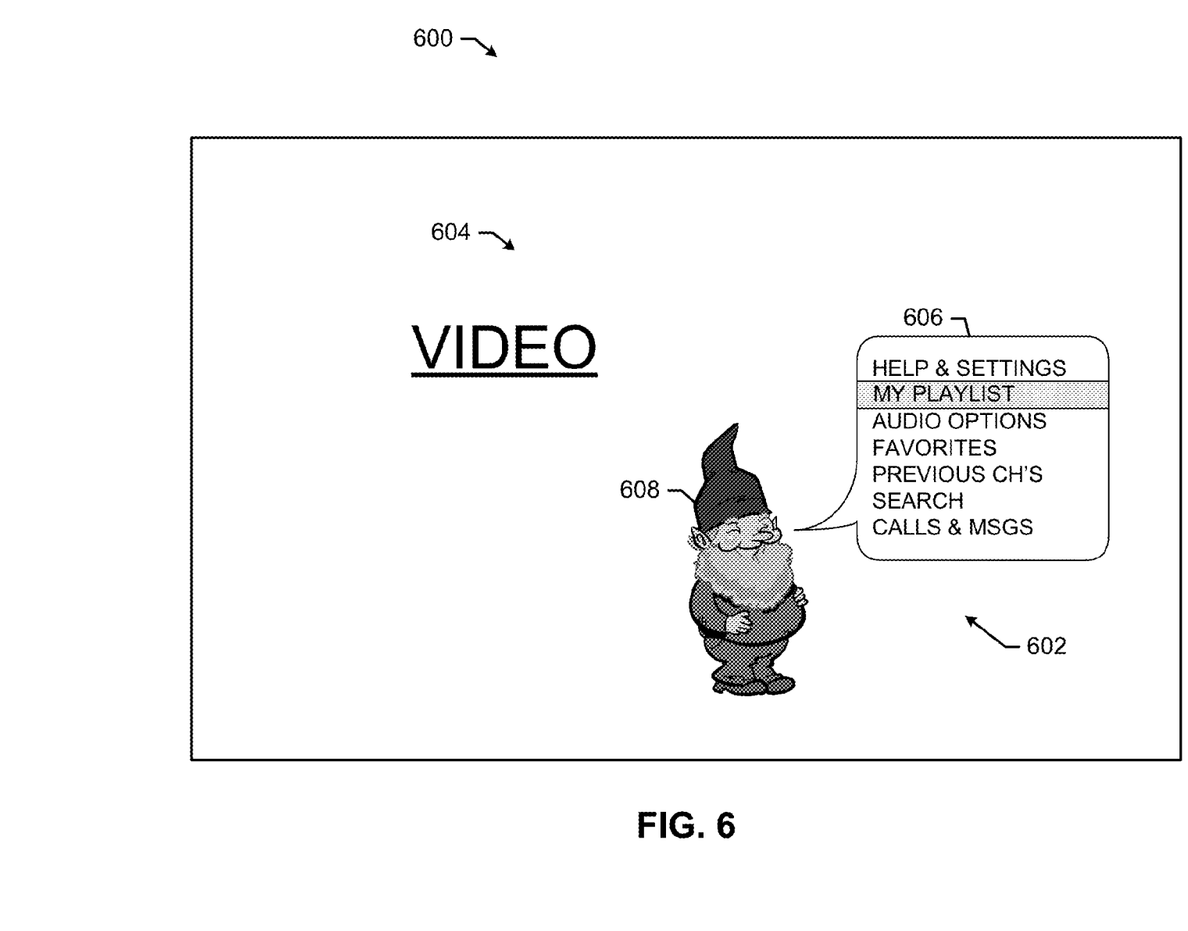
FIG. 6 shows an example screenshot of a media presentation system implementing the example avatar controller of FIG. 2 to convey an example avatar in association with an example user interface element.

FIG. 6 shows an example screenshot 600 including an example avatar 602 laid over a full-screen presentation 604. In the illustrated example, the avatar 602 is conveyed in association with a main menu 606 that is displayed in response to the selection of the 'Menu' button. The avatar 602 comprises a graphic 608 interacting with the menu 606. In particular, the menu 606 is located in a conversation bubble originating from the graphic 608, such that the character of the graphic 608 appears to be speaking the menu 606. The graphic 608 may interact with the menu 606 in other manners depending on, for example, the personality of the character on which the avatar 602 is based. The example avatar 602 of FIG. 6 is a generic character. However, in other examples, the avatars described herein are based on, for example, characters from actual shows. For example, an avatar may be based on a popular character in an animated television series (e.g., primetime programming and/or programming targeted to children). Further, when the interface module 300 causes the screenshot 600 to be presented, the avatar 602 may undergo an animation before presenting the menu 606. For example, the graphic 608 may be animated to appear to be walking across the screen, after which the menu 606 may be displayed. Of course, other types of animations and/or variations on the behavior of the avatar 602 are possible.

The interface module 300 can then receive input from the user regarding a choice made from the menu 606. The input is conveyed to the appropriate component of the IRD 130 (e.g., the receiver 210 of FIG. 2) to respond to the input (block 446). Then, the example process 400 of FIGS. 4A and 4B determines if an option to deactivate the avatar has been selected (block 448). If so, the interface module 300 receives the deactivation input and conveys a message to the profile module 304 to deactivate the currently active avatar (block 450). For example, a bit or file entry may be set (e.g., to a logic high) or unset (e.g., to a logic low).

Referring back to block 442, if the user interface has not been activated, the example process 400 of FIGS. 4A and 4B determines if the avatar is scheduled to take an action (block 452). As described above, the avatars described herein may function according to a schedule and/or may include random tasks to be performed when active. The information stored in the profile module 304 in association with the avatars includes such parameters, which are conveyed to the interface module 300 so that the avatars can take the appropriate actions (block 454). In some implementations, whether the actions are taken depends on the state of the presentation system. For example, when the interface module 300 receives instructions that the active avatar is to take a random action (e.g., a character flying across the screen and giving the user a message, such as an advertisement for an upcoming program or newly released movie), the interface module 300 first consults the presentation state detector 306 to determine if the presentation system is in a full-screen presentation mode. If so, the interface module 300 may restrict the random action because it may be considered annoying by an audience. However, if the presentation state detector 306 determines that a program guide is being presented over a majority of the screen, the interface module 300 implements the random action.

Figure 7:
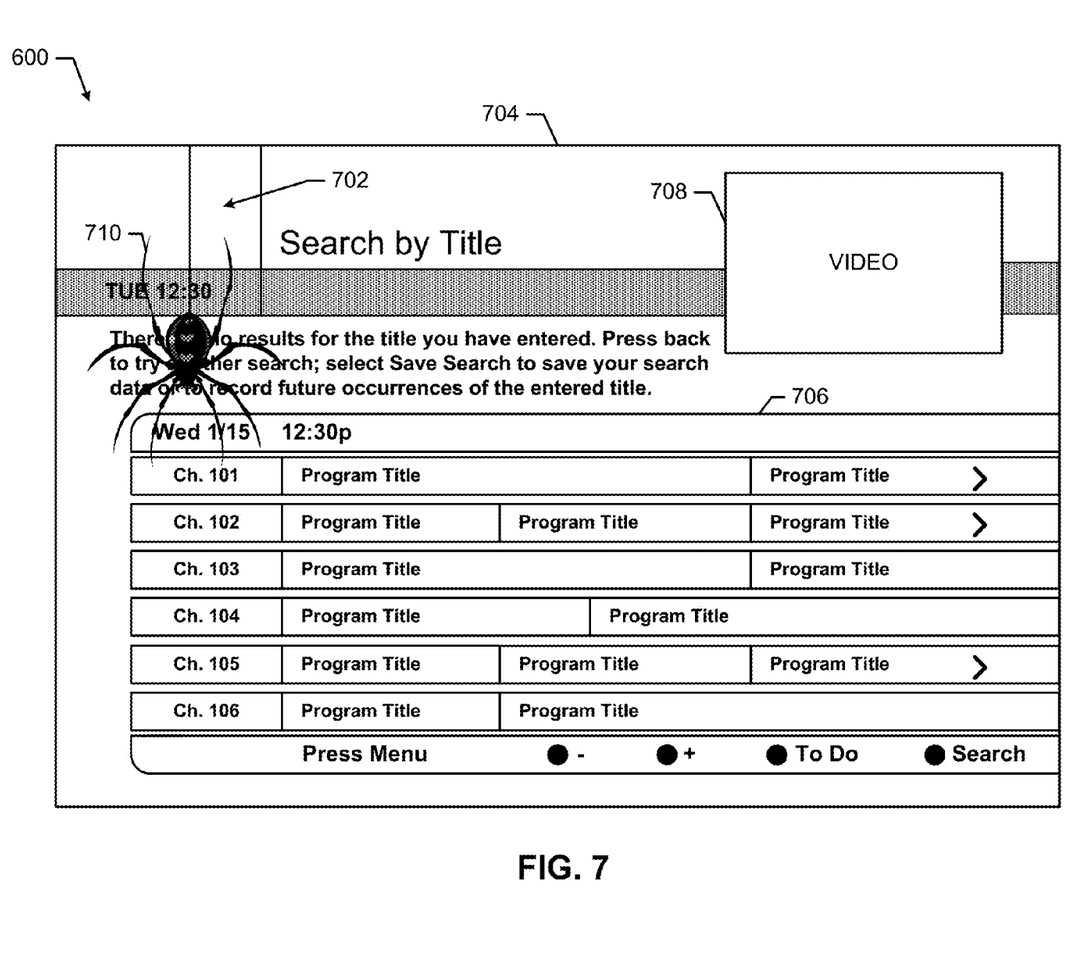
FIG. 7 shows an example screenshot of a media presentation system implementing the example avatar controller of FIG. 2 to convey an example avatar performing an example avatar action in association with an example program guide.

FIG. 7 shows an example screenshot 700 including an example avatar 702 performing an example avatar action over a program guide 704. The program guide 704 includes a listing 706 of available programming and a video section 708 to present currently viewed programming. In some examples, certain aspects or characteristics of the program guide 704 may be personalized or customized as part of the avatar configuration settings. The example avatar 702 includes a graphic 710 that may be chosen by, for example, a user who enjoys horror movies and/or programs. In the illustrated example, the graphic 710 is animated to appear as if the graphic 710 is crawling down the screen. While the example screenshot 700 of FIG. 7 is the result of a random action to be taken, the example avatar 702 of FIG. 7 may alternatively be triggered to inform the user of a system message (e.g., overdue payment, upcoming shows, completion of a download, etc.), as a responsive event. After the avatar has taken the action (block 454), control passes to block 446, as described above.

Figure 8:
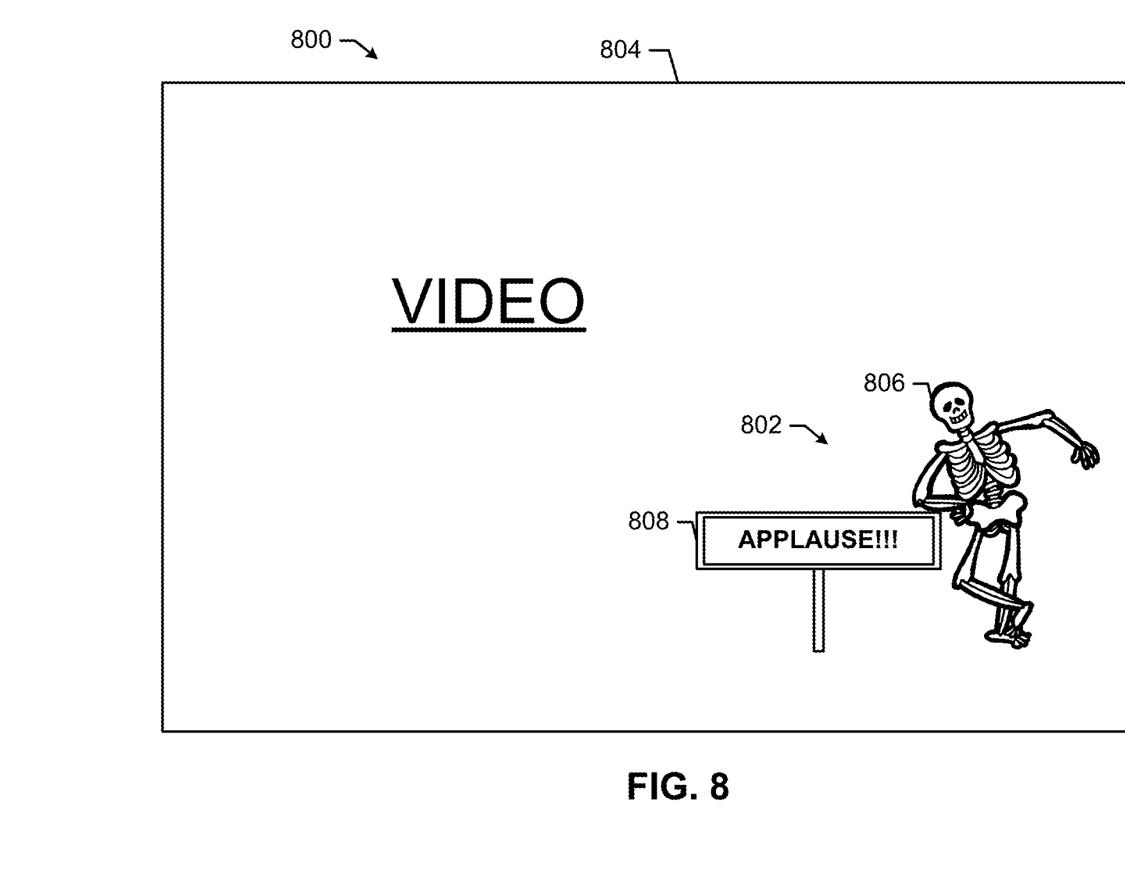
FIG. 8 shows an example screenshot of a media presentation system implementing the example avatar controller of FIG. 2 to convey an example avatar over a full-screen presentation.

FIG. 8 shows an example screenshot 800 including an example avatar 802 taking an action over a full-screen presentation 804. The example avatar 802 includes a graphic 806 providing the user a message 808. In particular, the avatar 802 and the message 808 are conveying an 'Applause' sign similar to those used in television studios. As described above, the profile module 304 includes information associated with the avatars including, for example, a set of actions. Such a set of actions may be programmed to be performed in response to an event associated with the user interface. For example, the example avatar 802 of FIG. 8 may be triggered by a completion of a configuration process (e.g., configuration of a remote control or user preferences) or a download process (e.g., a download of an on-demand movie). In another example, the example avatar 802 of FIG. 8 may be triggered in response to a purchase of a new subscription. In another example, an avatar action may be triggered in response to a purchase of a pay-per-view that delivers a message to the user, such as "Get some popcorn! You're pay-per-view movie is about to start!" Other implementations may include alternative or additional avatars and avatar actions that correspond to events or actions taken in the user interface.

Referring back to block 452, if no avatar action is scheduled, the example process 400 of FIGS. 4A and 4B determines if another avatar option is engaged (block 456). For example, a remote control may include a button or key to enable the user to cause the active avatar to take an action. In response, the active avatar may take an animated path across a full-screen presentation for entertainment purposes. Other avatar options include invoking a game implemented by the avatar. As described above, different avatars may implement different or the same games, which may be related to the avatar, the user, and/or currently displayed content. In response, the interface module 300 takes the action associated with the selected avatar option and passes control to block 446, as described above.

Figure 9:
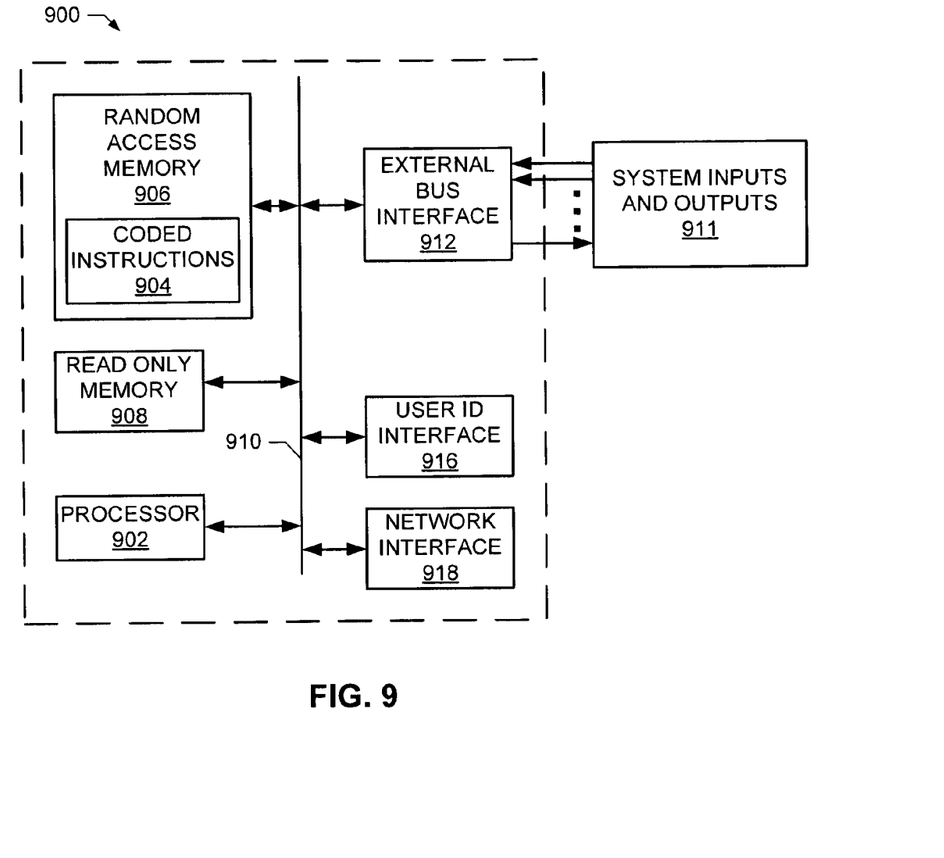
FIG. 9 illustrates an example manner of implementing an example processor unit to execute the example methods and apparatus described herein.

FIG. 9 is a schematic diagram of an example manner of implementing an example processor unit 900 to execute the example methods and apparatus described herein. The example processor unit 900 of FIG. 9 includes a general purpose programmable processor 902. The example processor 902 may execute, among other things, machine accessible instructions 904 (e.g., instructions present within a random access memory (RAM) 906 as illustrated and/or within a read only memory (ROM) 908) to perform the example processes described herein. The example processor 902 may be any type of processing unit, such as a microprocessor.

The processor 902 may be coupled to an interface, such as a bus 910 to which other components may be interfaced. The example RAM 906 may be implemented by dynamic random access memory (DRAM), Synchronous DRAM (SDRAM), and/or any other type of RAM device, and the example ROM 908 may be implemented by flash memory and/or any other desired type of memory device. Access to the example memories 908 and 906 may be controlled by a memory controller (not shown) in a conventional manner.

To send and/or receive system inputs and/or outputs 911, the example processor unit 900 includes any variety of conventional interface circuitry such as, for example, an external bus interface 912. For example, the external bus interface 912 may provide one input signal path (e.g., a semiconductor package pin) for each system input. Additionally or alternatively, the external bus interface 912 may implement any variety of time multiplexed interface to receive output signals via fewer input signals.

To allow the example processor unit 900 to interact with a remote server, the example processor unit 900 may include any variety of network interfaces 918 such as, for example, an Ethernet card, a wireless network card, a modem, or any other network interface suitable to connect the processor unit 900 to a network. The network to which the processor unit 900 is connected may be, for example, a local area network (LAN), a wide area network (WAN), the Internet, or any other network. For example, the network could be a home network, an intranet located in a place of business, a closed network linking various locations of a business, or the Internet.

Although an example processor unit 900 has been illustrated in FIG. 9, processor units may be implemented using any of a variety of other and/or additional devices, components, circuits, modules, etc. Further, the devices, components, circuits, modules, elements, etc. illustrated in FIG. 9 may be combined, re-arranged, eliminated and/or implemented in any of a variety of ways.

The apparatus and methods described above are non-limiting examples. Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Further, although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. An apparatus for use in a broadcast media presentation system, comprising:
   a user interface to enable a user interaction with the broadcast media presentation system;
   a memory to store a user profile including one or more settings for a customizable graphical element to be presented in connection with the user interface when the user interacts with the user interface, wherein a feature of the customizable graphical element is locked as unavailable to the user when an amount of programming viewing performed on the broadcast media presentation system by the user associated with the customizable graphical element is below a threshold; and
   a communication interface to enable the apparatus to receive data regarding the one or more settings of the user profile from a web server hosting a web site on which the user is to input information to configure the one or more settings.

2. An apparatus as defined in claim 1, wherein the customizable graphical element comprises one or more avatars.

3. An apparatus as defined in claim 1, wherein the web site is to enable a second user to configure a second customizable graphical element by inputting information regarding one or more settings stored in a second profile associated with the second user.

4. An apparatus as defined in claim 1, wherein a configuration interface of the web site comprises a feature to enable the user to upload a file to be used to configure the customizable graphical element.

5. An apparatus as defined in claim 4, wherein a provider of the web site is to incorporate the uploaded file into an image associated with the customizable graphical element of the user.

6. An apparatus a defined in claim 1, wherein data used to implement the customizable graphical element is provided by at least one of an advertiser, a media company, or a service provider of the broadcast media presentation system.

7. An apparatus as defined in claim 1, wherein the customizable graphical element comprises one or more graphics representing one or more actors or animated characters.

8. An apparatus as defined in claim 1, wherein a characteristic of the user interface is to be altered according to a characteristic of the customizable graphical element.

9. An apparatus as defined in claim 1, wherein the customizable graphical element is to perform an animation to present an element of the user interface in response to the user accessing the element of the user interface.

10. An apparatus as defined in claim 1, wherein the customizable graphical element is to communicate a message associated with a status of the user interface to the user.

11. An apparatus as defined in claim 1, wherein the customizable graphical element is to implement an interactive game to be presented to the user via the apparatus.

12. An apparatus as defined in claim 11, wherein meeting a threshold score in the interactive game is to result in an award being provided to the user, wherein the reward comprises a coupon redeemable by the user to download a fee inducing product via the broadcast media presentation system.

13. An apparatus as defined in claim 1, wherein the broadcast media presentation system comprises a set-top box.

14. An apparatus as defined in claim 1, wherein the locked feature of the customizable graphical element is to be unlocked in response to the amount of viewing performed by the user on the broadcast media presentation system exceeding a threshold.

15. A method for use in a broadcast media presentation system, comprising:
   implementing a user interface to enable a user interaction with the broadcast media presentation system;
   storing, on a memory of an apparatus, a user profile including one or more settings for a customizable graphical element to be presented in connection with the user interface when the user interacts with the user interface;
   locking a feature of the customizable graphical element as unavailable to the user when an amount of programming viewing performed on the broadcast media presentation system by the user is below a threshold; and
   enabling the apparatus to receive data regarding the one or more settings of the user profile from a web server hosting a web site on which the user is to input information to configure the one or more settings.

16. A method as defined in claim 15, further comprising unlocking the locked feature in response to the amount of programming viewing performed by the user on the broadcast media presentation system exceeding the threshold.

17. A media presentation system, comprising:
   a receiver comprising an avatar controller to manage an operation of an avatar, wherein the avatar comprises a customization of one or more elements of a user interface, the avatar controller to use a profile module to store a set of avatar settings configured by a user, the avatar controller to lock a feature of the customizable graphical element as unavailable to the user when an amount of programming viewing performed on the broadcast media presentation system by the user is below a threshold; and
   a processor, in communication with the receiver, including a configuration interface to enable the user to configure the set of avatar settings and to convey the user configuration for the avatar settings to the receiver for storage in the profile module.

* * * * *